United States Patent [19]

Stephens

[11] Patent Number: 5,094,425
[45] Date of Patent: Mar. 10, 1992

[54] ENGINE MOUNTING ARRANGEMENT

[75] Inventor: Donald L. Stephens, LaConner, Wash.

[73] Assignee: PACCAR Inc., Bellevue, Wash.

[21] Appl. No.: 515,866

[22] Filed: Apr. 27, 1990

[51] Int. Cl.5 ............................................. F16M 13/00
[52] U.S. Cl. ..................................... 248/605; 248/638
[58] Field of Search ............... 248/638, 595, 596, 598, 248/612, 659, 675, 184, 185, 284, 605; 180/291, 298, 299, 300

[56] References Cited

U.S. PATENT DOCUMENTS

| | | |
|---|---|---|
| 874,405 | 12/1907 | Ide . |
| 1,139,861 | 5/1915 | Gruenewald . |
| 1,579,592 | 4/1926 | Bowen ................... 248/675 |
| 1,738,532 | 12/1929 | Harbour . |
| 1,803,099 | 4/1931 | Davis et al. . |
| 1,817,633 | 8/1931 | Lovejoy . |
| 1,818,002 | 8/1931 | Moorhouse . |
| 1,818,715 | 8/1931 | Keys . |
| 1,826,359 | 10/1931 | Masury . |
| 1,829,676 | 10/1931 | Royce . |
| 1,834,879 | 12/1931 | Trott . |
| 1,908,779 | 5/1933 | Morrison . |
| 1,976,701 | 10/1934 | Trott . |
| 2,028,549 | 1/1936 | Lord ...................... 248/605 |
| 2,044,714 | 6/1936 | Trott ...................... 248/7 |
| 2,133,226 | 10/1938 | Hann ...................... 137/68 |
| 2,138,600 | 11/1938 | Harmon ................. 248/284 |
| 2,864,573 | 12/1958 | Olley ..................... 248/605 |
| 3,548,964 | 12/1970 | Krauss ................... 248/605 |
| 4,240,517 | 12/1980 | Harlow, Jr. et al. ..... 180/295 |
| 4,328,648 | 5/1982 | Kalpins .................. 248/638 |
| 4,377,218 | 3/1983 | Fukushima ............. 180/300 |
| 4,643,270 | 2/1987 | Beer ....................... 180/299 |

FOREIGN PATENT DOCUMENTS

| | | | |
|---|---|---|---|
| 931614 | 11/1947 | France ................... 248/612 |
| 288789 | 9/1928 | United Kingdom .... 248/659 |
| 532565 | 1/1941 | United Kingdom .... 180/300 |

Primary Examiner—David M. Purol
Assistant Examiner—Robert A. Olson
Attorney, Agent, or Firm—Seed and Berry

[57] ABSTRACT

A front engine mount for mounting an engine to a vehicle frame. The engine mount includes a connecting link pivotably secured at one end thereof to the front of the engine and pivotably secured at the opposite end thereof to the vehicle frame. The connecting link can be installed so as to be in either tension or compression. In compression, the end of the link connected to the engine is above the opposite end connected to the vehicle frame; in tension, the end of the link connected to the engine is below the opposite end connected to the vehicle frame. An alternate mounting arrangement utilizes a plurality of rollers disposed between an engine bracket and the crossmember for supporting the engine. The rollers provide the engine with lateral freedom permitting the engine to rotate, or vibrate, about the least energy axis.

6 Claims, 2 Drawing Sheets

ENGINE MOUNTING ARRANGEMENT

TECHNICAL FIELD

This invention relates to the field of mounting engines in such a manner as to minimize the amount of vibration transmitted from the engine to the vehicle frame.

BACKGROUND OF THE INVENTION

It is understood that all engines transmit vibrations to the frame of the vehicle. However, the degree of vibration which is transmitted depends upon the manner in which the engine is mounted to the frame.

An engine has the natural tendency during operation to rotate about an axis which has the least moment of inertia. This axis is known as the "least energy" axis. The least energy axis is illustrated in FIG. 1 of the application, and generally extends in the longitudinal direction of the engine, passing through the center of gravity of the engine and rising towards the front of the engine at about a 12° angle. In mounting an engine, there are two competing concerns. The first is the concern that the engine be securely mounted to the frame in a stable manner, while the second is that the engine be mounted to the frame in such a manner as to permit the engine to vibrate about the least energy axis. The latter concern is important because it is commonly recognized that an engine will transmit the lowest level of vibration to the vehicle frame if it is elastically mounted so that it can freely pivot, and therefore vibrate, about the least energy axis. Failure to permit such free vibration results in transmission of various vibration modes to the frame.

Truck engines are generally mounted so that the rear portion of the engine is mounted in two transversely spaced locations, on either side of the flywheel housing. At this longitudinal position, the least energy axis is substantially between the two mounting points, such that the virtual mounting point approximately coincides with the least energy axis. Therefore, the engine is free to rotate about the least energy axis such that the transmission of vibration to the vehicle frame is minimized.

The point at which the front of the engine is generally mounted is below the least energy axis at the longitudinal position of the mounting point. Therefore, when the engine tends to vibrate, or pivot, about the least energy axis the mounting point of the engine tends to move laterally by an arc length corresponding to the angle that the engine pivots. If the front engine mount resists such lateral movement, the engine vibrates in modes other than simple rotation and these vibrations are transmitted to the vehicle frame.

To correct this problem, it is common to utilize a dual mounting arrangement similar to the rear mounting arrangement. In particular, it is known to mount the front of the engine in two transversely spaced locations where the virtual, or equivalent, mounting point coincides with the least energy axis at that position. Additionally, efforts have been made to mount the front of the engine using a single mounting point which has lateral compliance. For instance, U.S. Pat. No. 2,044,714 discloses a front-end mounting arrangement where a pair of rubber blocks are disposed between an engine bracket and seat in such a manner as to permit the engine to pivot about point. Such an arrangement restrains the pivotal movement of the engine about the pivot axis. Thus, vibrational forces are exerted from the motor 1 on the frame 3 through the rubber blocks 7 in a transverse direction.

SUMMARY OF THE INVENTION

The object of the invention is to provide an engine mounting arrangement which overcomes the above-mentioned problems associated with the conventional arrangement.

In particular, it is an object of the invention to provide a front engine mount which minimizes the amount of vibration transmitted from the engine to the vehicle frame.

It is a further object to provide a front engine mount which permits the engine to pivot about its least energy axis such that the vibration transmitted to the vehicle frame is minimized, and yet which prevents lateral movement of the engine.

These and other objects, which will become more apparent from the ensuing description of the preferred embodiment of the invention, are accomplished by a front engine mount utilizing a connecting link which is pivotably secured at one end thereof to the front of the engine and pivotably secured at the opposite end thereof to the vehicle frame. The connecting link can be installed so as to be in either tension or compression. In compression, the end of the link connected to the engine is above the opposite end connected to the vehicle frame. In tension, the end of the link connected to the engine is below the opposite end connected to the vehicle frame. Each of these arrangement provides the necessary lateral freedom for the engine to pivot, or vibrate, about its least energy axis.

According to a second embodiment of the invention, a roller mounting arrangement is utilized. The roller arrangement includes an engine bracket mounted to the engine and having a substantially flat bottom surface, a horizontal cross member connected to the vehicle frame and disposed below the engine bracket, and a plurality of rollers disposed between the flat bottom surface of the engine bracket and the crossmember, the longitudinal axes of the rollers being parallel to the longitudinal axis of the engine. In this manner, the engine is free to move laterally with respect to the vehicle frame and, therefore, is able to pivot, or vibrate, about the least energy axis.

DETAILED DESCRIPTION OF THE INVENTION

As noted above, the rear of the engine 10 is mounted in the conventional manner utilizing two mounting points on either side of the flywheel housing. The rear mounts are sufficient to provide the necessary lateral support for both the front and rear of the engine.

Figure 1:
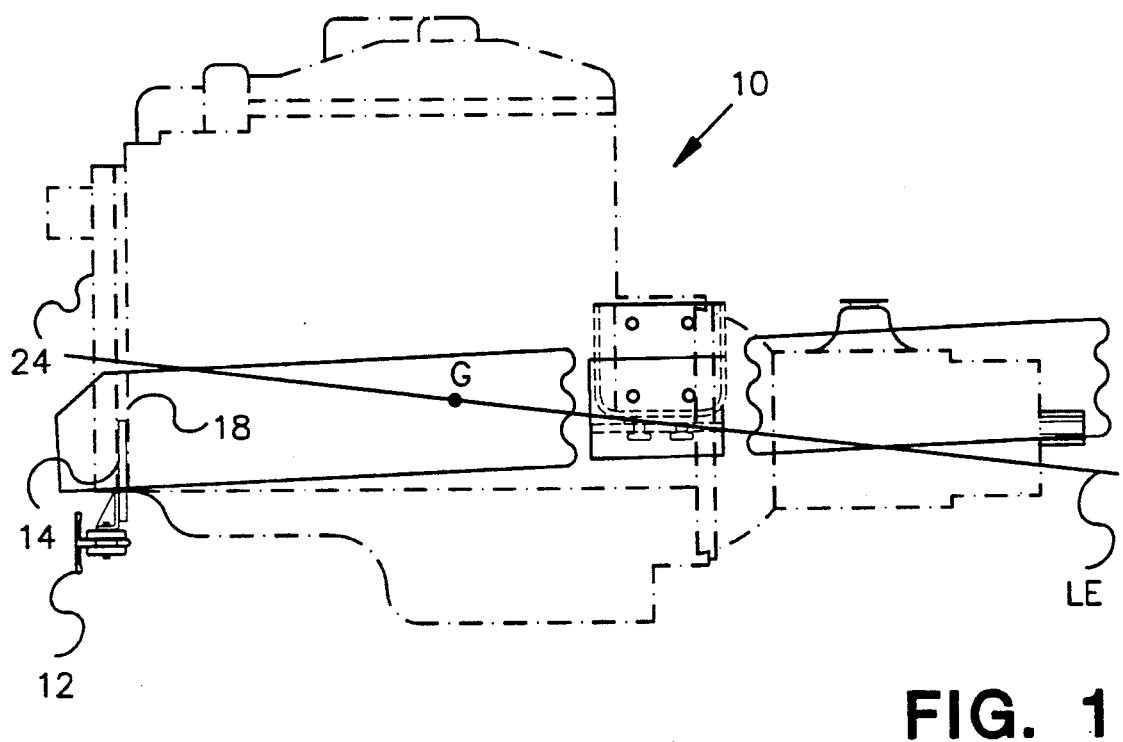
FIG. 1 is a side view of the mounting arrangement according to the present invention.
Figure 2:
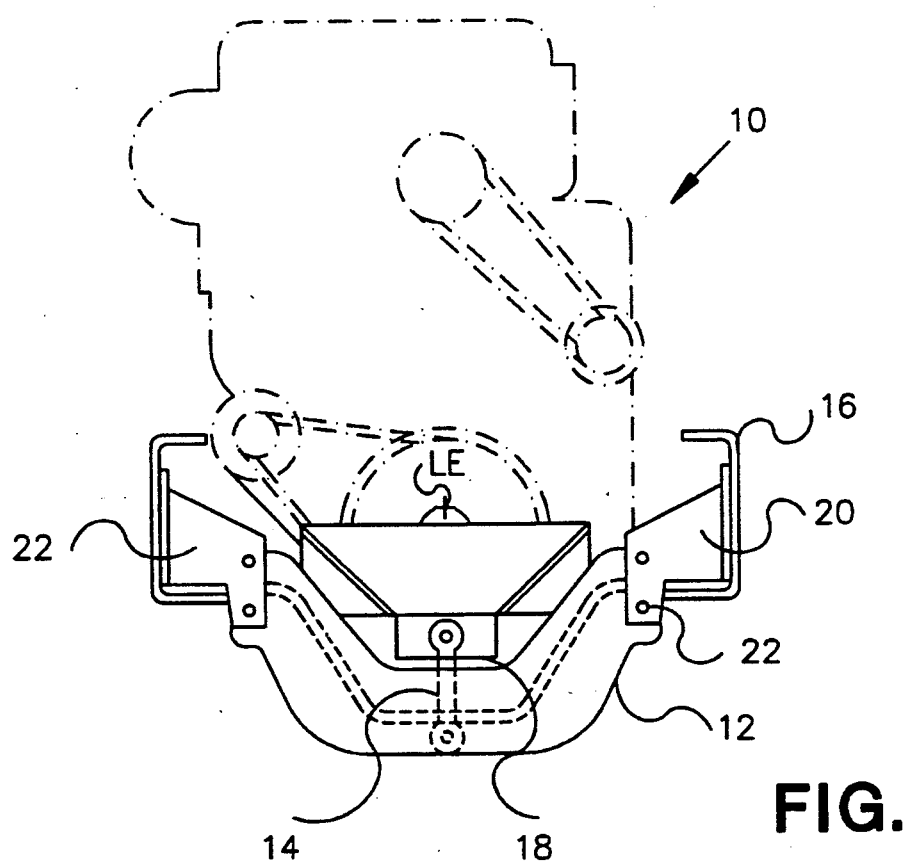
FIG. 2 is a front view of the FIG. 1 embodiment of the present invention.

As best illustrated in FIGS. 1 and 2, according to a first embodiment of the invention, the front of the engine 10 is mounted to a crossmember 12 of the vehicle frame 16 utilizing a connecting link 14. In particular, the connecting link 14 is pivotably secured at one end to an engine bracket 18 and at the other end to the crossmember 12. The crossmember 12 is substantially U-shaped and is connected at opposite ends thereof to the vehicle frame 16 via brackets 20. The crossmember 12 is connected to the brackets 20 using bolts 22 or any other suitable fastener.

As illustrated in FIGS. 1 and 2, the least energy axis LE extends substantially in the longitudinal direction with respect to the engine, passing through the center of gravity G of the engine and extending upwardly towards the front 24 of the engine at an approximate angle of 12 degrees. In the embodiment illustrated in FIGS. 1 and 2, the connecting link 14 is disposed directly below the least energy axis LE at the longitudinal position of the link. Accordingly, since the connecting link 14 is pivotably secured to the engine 10 and the crossmember 12, the lower portion of the engine, where the connecting link 14 is connected, is free to move in the lateral direction of the engine. Therefore, during operation, the engine is free to pivot the necessary degree about the least energy axis to insure that the engine vibration transmitted to the vehicle frame 16 is minimized.

Figure 3:
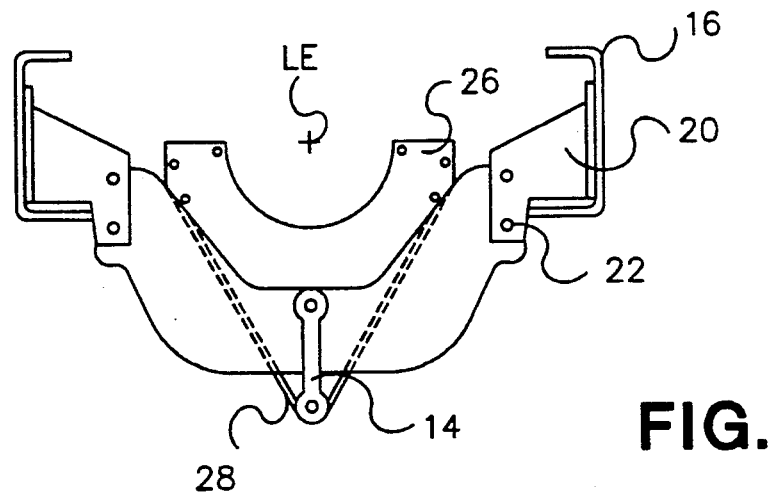
FIG. 3 is a front view of a second embodiment of a front mounting arrangement according to the present invention.

In the embodiment illustrated in FIGS. 1 and 2, the connecting link 14 experiences a compressive force from the weight of the engine 10. However, according to a second embodiment of the invention illustrated in FIG. 3 the connecting link 14 is positioned so as to experience a tensile force. Specifically, referring to FIG. 3, a substantially V-shaped engine bracket 26 is secured to the front of the engine such that the bottom portion 28 of the bracket extends below the crossmember 12. The connecting link 14 is pivotably connected at the bottom end thereof to the engine bracket 26 and at the top end thereof to the crossmember 14. The crossmember is attached to the vehicle body in the same manner described with respect to the FIGS. 1 and 2 embodiment utilizing brackets 20.

The optimum length of the connecting link 14 depends on the distance that the link 14 is displaced from the least energy axis. In particular, for a given degree of engine angular rotation due to engine vibration, and the further the connecting link is located from the least energy axis, the greater the lateral distance the engine will be displaced at the position of the connecting link 14. Accordingly, as the distance between the connecting link 14 and the least energy axis LE increases, the length of the connecting link 14 should correspondingly increase.

Figure 4:
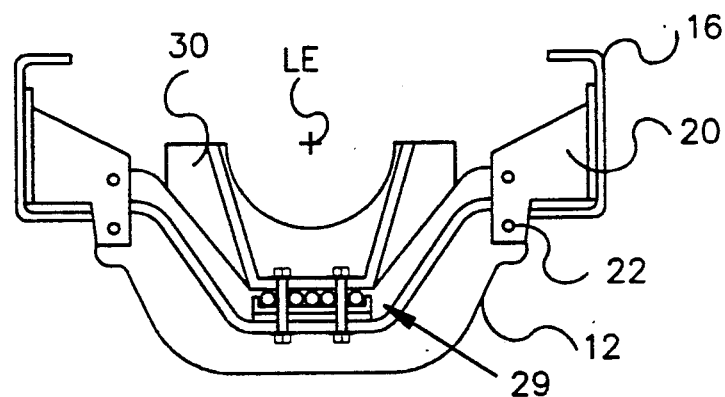
FIG. 4 is a front view of a third embodiment of a front mounting arrangement according to the present invention.
Figure 5:
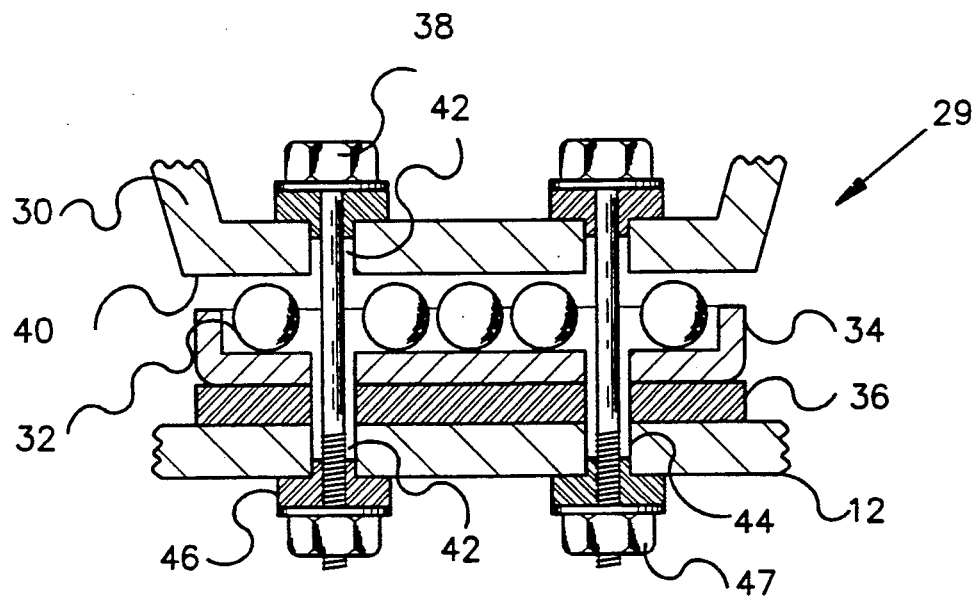
FIG. 5 is an enlarged, front view of the embodiment of FIG. 4.

As best illustrated in FIGS. 4 and 5, according to a third embodiment of the invention, a roller arrangement 29 is utilized as the front engine mount. The roller arrangement 29 includes an engine bracket 30, rollers 32, race 34, rubber pad 36 and bolts 38. The engine bracket 30 is designed to have a flat bottom surface 40 for resting on the rollers 32. The rollers 32, race 34 and rubber pad 36 are positioned between the crossmember 12 and the engine bracket 30, as illustrated in FIG. 4. The engine bracket 30, race 34, pad 36 and crossmember 12 each have a pair of holes 42 disposed therein for receiving bolts 38. Each hole 42 has a diameter that is substantially larger than each of the bolts so as to have a clearance 44 between each bolt 38 and each hole 42. A rubber grommet 46 is provided in each of the holes and a nut 47 is threaded to the end of each of the bolts.

The Figures do not illustrate the caging of the rollers 32 to prevent them from becoming displaced. However, it is understood that a conventional mechanical or elastomeric cage would suffice. Alternatively, the rollers 32 could be cages by designing the race so as to insure a close fit between the ends of the rollers and the race.

Referring to FIG. 4, the roller mount is disposed below the least energy axis. As noted above, there is a clearance 44 between each of the bolts and the holes to permit the engine bracket 30, and hence the lower portion of the engine 10, to move laterally by rolling on rollers 32. The amount of clearance 44 depends on the distance between the least energy axis LE and the mounting point. The greater the distance, the greater the required clearance in order to allow the engine to pivot about the least energy axis as necessary to accommodate the small degree of rotation associated with vibration. Accordingly, the roller mounting arrangement minimizes the vibrations transmitted to the vehicle frame.

As can be understood from the foregoing, by relying on the conventional rear engine mounting arrangement for providing the necessary lateral support for the entire engine, it is possible to arrive at a unique front engine mount that permits the engine to vibrate about the least energy axis. In this manner, the amount of vibrations transmitted to the vehicle frame is minimized.

I claim:

1. An engine mount for mounting an engine to a vehicle frame in such a manner as to minimize the amount of vibration transmitted from said engine to said frame wherein the engine includes a forward end, a rearward end, and first and second opposing sides and wherein the vehicle frame includes first and second sides, said engine mount comprising:

first and second mounting means for mounting the first and second sides of the rearward portion of the engine to the first and second sides of the vehicle frame so that the rearward portion of the engine is substantially fixed with respect to the vehicle frame whereby a least energy axis for rotation of the engine is defined and intersects a line that passes through the point at which said first and second mounting means fixed the engine to the vehicle frame, said first and second mounting means being constructed to provide sufficient lateral support for both the rearward and forward ends of the engine;

a crossmember having first and second ends for connecting said crossmember respectively to the first and second sides of the vehicle frame; and connecting link means for pivotally connecting said engine to said crossmember, said connecting link means having a first end pivotally coupled to said crossmember and a second end for pivotal connection to the forward end of the engine so that during operation, the forward end of the engine rotates freely, within a limited range, about the least energy axis.

2. A vehicle comprising:

a vehicle frame, having a forward end, a rearward end, and first and second opposite sides;

an engine having a forward end, a rearward end, and first and second opposite sides;

first and second mounting means for mounting said first and second sides of said rearward portion of said engine to said first and second sides of said rearward end of said vehicle frame so that said rearward end of said engine is substantially fixed with respect to said vehicle frame whereby a least energy axis for rotation of said engine is defined, said first and second mounting means being constructed to provide sufficient lateral support for both said rearward and said forward ends of said engines;

a crossmember having first and second ends connected respectively to said first and second side of said forward end of said vehicle frame; and a connecting link having first and second ends, said first end of said connecting link being pivotably connected to said engine and said second end of said connecting link being pivotably connected to said crossmember such that during operation, said engine is pivotable about the least energy axis.

3. The engine mount of claim 2 wherein said connecting link is displaced from said least energy axis.

4. The engine mount of claim 3 wherein said one end connected to said engine is above said other end connected to said crossmember such that the force exerted on said link by the weight of said engine is a compressive force.

5. The engine mount of claim 3 wherein said first end of said connecting link is connected to said engine horizontally below said second end of said connecting link such that the force exerted on said link by the weight of said engine is a tension force.

6. The engine mount of claim 3 wherein said connecting link further comprises an intermediate portion intermediate said first and second ends, said intermediate portion having a length determined by the distance from the least energy axis to said first end of said connecting link so that the greater the distance between said first end of said connecting link and the least energy axis the greater the length of said intermediate portion of said connecting link.

* * * * *